US008619279B2

(12) United States Patent  
Evanitsky (10) Patent No.: US 8,619,279 B2
(45) Date of Patent: Dec. 31, 2013

(54) METHOD AND SYSTEM FOR AUTOMATICALLY REDIRECTING JOBS IN A DEVICE COMMUNITY

(75) Inventor: Eugene Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 483 days.

(21) Appl. No.: 12/950,248

(22) Filed: Nov. 19, 2010

(65) Prior Publication Data

US 2012/0127511 A1    May 24, 2012

(51) Int. Cl.
*G06K 15/00* (2006.01)
*G06F 3/12* (2006.01)
*G06F 15/173* (2006.01)

(52) U.S. Cl.
USPC ......... 358/1.14; 358/1.15; 709/238; 709/243; 709/244

(58) Field of Classification Search
USPC ................ 358/1.14, 1.15; 709/238, 243, 244
See application file for complete search history.

(56) References Cited

U.S. PATENT DOCUMENTS

| | | | |
|---|---|---|---|
| 6,064,838 A * | 5/2000 | Maruta et al. | 399/79 |
| 6,636,499 B1 | 10/2003 | Dowling | |
| 6,725,264 B1 | 4/2004 | Christy | |
| 6,809,831 B1 * | 10/2004 | Minari | 358/1.15 |
| 7,634,551 B2 | 12/2009 | Tredoux et al. | |
| 7,688,794 B2 | 3/2010 | Tredoux et al. | |
| 7,706,364 B2 | 4/2010 | Smith et al. | |
| 2003/0133146 A1 * | 7/2003 | Parry | 358/1.15 |
| 2007/0133041 A1 | 6/2007 | Tredoux et al. | |
| 2007/0201078 A1 | 8/2007 | Morales et al. | |
| 2008/0183891 A1 | 7/2008 | Ni et al. | |
| 2009/0015859 A1 | 1/2009 | Bothner et al. | |
| 2010/0149565 A1 * | 6/2010 | Mori | 358/1.9 |

* cited by examiner

*Primary Examiner* — Fred Guillermety
(74) *Attorney, Agent, or Firm* — Luis M. Ortiz; Kermit D. Lopez; Ortiz & Lopez, PLLC (57) ABSTRACT

A system and method for automatically redirecting a job in a community of networked devices. A peer-based device community can be created by connecting at least two networked devices utilizing a manual/self-discovery approach based on a set of rules and policies in order to interact and publish a device capability within the device community. A self-assessment approach can be employed to monitor and track the status and consumables of each networked device. A device can perform a self-assessment based on particular criteria and then determine, based on such criteria, whether to request assistance. Such a request is broadcast by the device and includes job ticket data and data indicating why such a request is being made. Devices receiving the request then perform a self-assessment in relation to the specific job and determine if they can provide better service. The job can be automatically transmitted between the networked devices in response to a help request with respect to an exception condition in the device community. A notification indicative of the transmission of the job to another device can be provided to a user. Such an approach provides an internal workload balancing with greater customer satisfaction by re-routing the job from the devices in the exception conditions.

20 Claims, 6 Drawing Sheets

METHOD AND SYSTEM FOR AUTOMATICALLY REDIRECTING JOBS IN A DEVICE COMMUNITY

TECHNICAL FIELD

Embodiments are generally related to networked devices such as, for example, printers, scanners, client devices, photocopy machines, multi-function devices, and the like. Embodiments are additionally related to a community of networked peer devices.

BACKGROUND OF THE INVENTION

Networked devices such as, for example, multi-function devices, scanners, photocopy machines, client devices, file servers, print servers, and work flow engines are employed in a wide variety of production environments such as, for example, print shops, offices, education institutions, drug stores, libraries, computer labs, and the like. Such networked rendering devices can be communicatively linked with a client device, for example, in order to assist in providing various rendering operations such as printing, scanning, and other operations within a network.

Conventionally, a job can be manually transmitted from one device to another in a network; however, quality issues may result in customer or user dissatisfaction with the transmitted job. Additionally, manual redirection of a job from one device to another can be frustrating, time consuming, and generic rather than specific to the immediate usage profile of the devices in complex rendering applications. Alternatively, networked devices can be configured into clusters, wherein the devices in each cluster are physically proximate to one another. A program routine executed by a network server may direct the job to another device in the cluster. A network server may select the device to which the task is diverted based on device availability. Such prior art approaches do not securely transfer the job and communications between the server and the networked devices typically occur external to a customer or user firewall.

Based on the foregoing, it is believed that a need exists for an improved system and method for automatically redirecting a job in a community of networked devices, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a networked community of peer devices.

It is another aspect of the disclosed embodiments to provide for an improved system and method for automatically redirecting a job within a community of networked peer devices.

The aforementioned aspects and other objectives and advantages can now be achieved as described herein. A system and method for automatically redirecting a job in a community of networked devices is disclosed herein. A peer-based device community can be created by connecting at least two networked devices (e.g., a rendering device) utilizing a manual/self-discovery approach based on a set of rules and policies in order to interact and publish a device capability within the device community. A self-assessment approach can be employed to monitor and track the status and consumables of each networked device. The job can be automatically transmitted between the networked devices in response to a help request with respect to an exception condition (e.g., paper jam, low consumable/quality level, diagnostic mode, print limit, and large queue) in the device community. A notification indicative of the transmission of the job to another device can be provided to a user. Such an approach provides an internal workload balancing with greater customer satisfaction by re-routing the job from the devices in the exception conditions.

The help request can be transmitted within the community if a fault device necessitates to transfer the workload to another device and/or the device that possess a print limit is unable to complete the job. The networked devices can request allocations from other devices in order to complete and/or accept the jobs in the community. The device that possesses capability to complete the job can further indicate acceptance of the job of the fault device based on its compatibility to process the job. The networked devices in the device community can be communicated via a standard protocol such as a SNMP (Simple. Network Management Protocol) and a file transfer protocol. Each device in the community can be connected via a peer-to-peer connection in order to communicate the capabilities of other devices in the community. The job can be moved from one peer to another based on the policies, state, and functionality of the original peer thereby reducing the need for re-submission.

The networked devices can be connected as a member of one or more communities in order to enable bridging between the communities. The networked devices described herein are also capable of self-updating and sharing pre-paid print allocations within the community and contact external resources that describe device capabilities for a specific device. Such devices can also effectively share/compare policy checks with respect to the job across the device community. Such an approach effectively process and manage the resources with respect to the device community and minimize communications outside a customer firewall with a perception of higher security.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, one or more of the disclosed embodiments can be embodied as a method, system, or computer program usable medium or computer program product. Accordingly, the disclosed embodiments can in some instances take the form of an entire hardware embodiment, an entire software embodiment or an embodiment combining both software and hardware aspects all generally referred to herein as a "module." Furthermore, the disclosed embodiments may take the form of a computer usable medium or computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) or another appropriate programming language, depending upon design considerations. The computer program code, however, for carrying out operations of the present invention may also be written in conventional procedural programming languages such as the "C" prog ramming language or in a visually oriented programming environment such as, for example, Visual Basic. The program code described herein can be configured entirely on devices within the community. The only connection to a client computer involves notifying such a computer regarding what has changed or to request approval for such a change.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
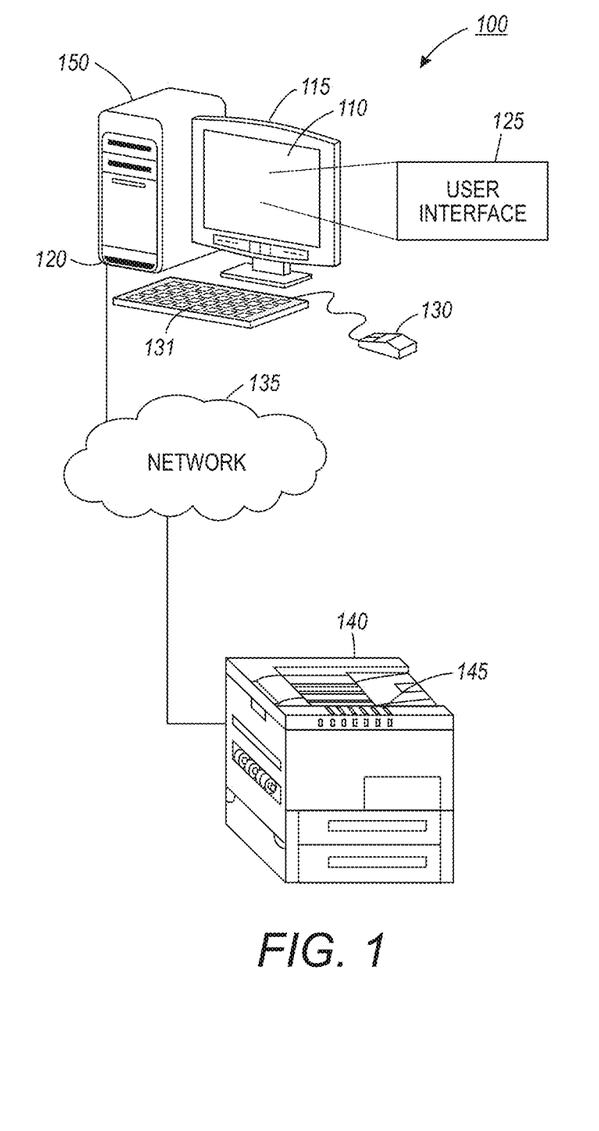
FIG. 1 illustrates an example of a networked device coupled to a data-processing apparatus through a network, in accordance with the disclosed embodiments.

Referring to FIG. 1, system 100 can be configured to include one or more networked devices, such as networked device 140, coupled to a data-processing apparatus 110 through a network 135. In some embodiments, networked device 140 may be a rendering device such as a printer, scanner, copy machine, etc. In other embodiments, networked device 140 may be a MFD, a file server, and/or a print server. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140, may be included in association with the data-processing apparatus 110 as desired.

Note that as utilized herein, the term networked device may refer to an apparatus or system such as a printer, scanner, fax machine, copy machine, etc., and/or a combination thereof (e.g., a MFD). Preferably, networked device 140 is a MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions such as scanning, faxing, printing, and copying.

The data-processing apparatus 110 can be coupled to the rendering device 140 (and other rendering devices) through a computer network 135. Network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The networked device 140 includes a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through the device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140, for example, may be a local user interface 125 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (POA) or the like, as noted above.

The following description is presented with respect to embodiments of the present invention, which can be embodied in the context of a data-processing apparatus 110 and networked device 140 depicted in FIG. 1. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
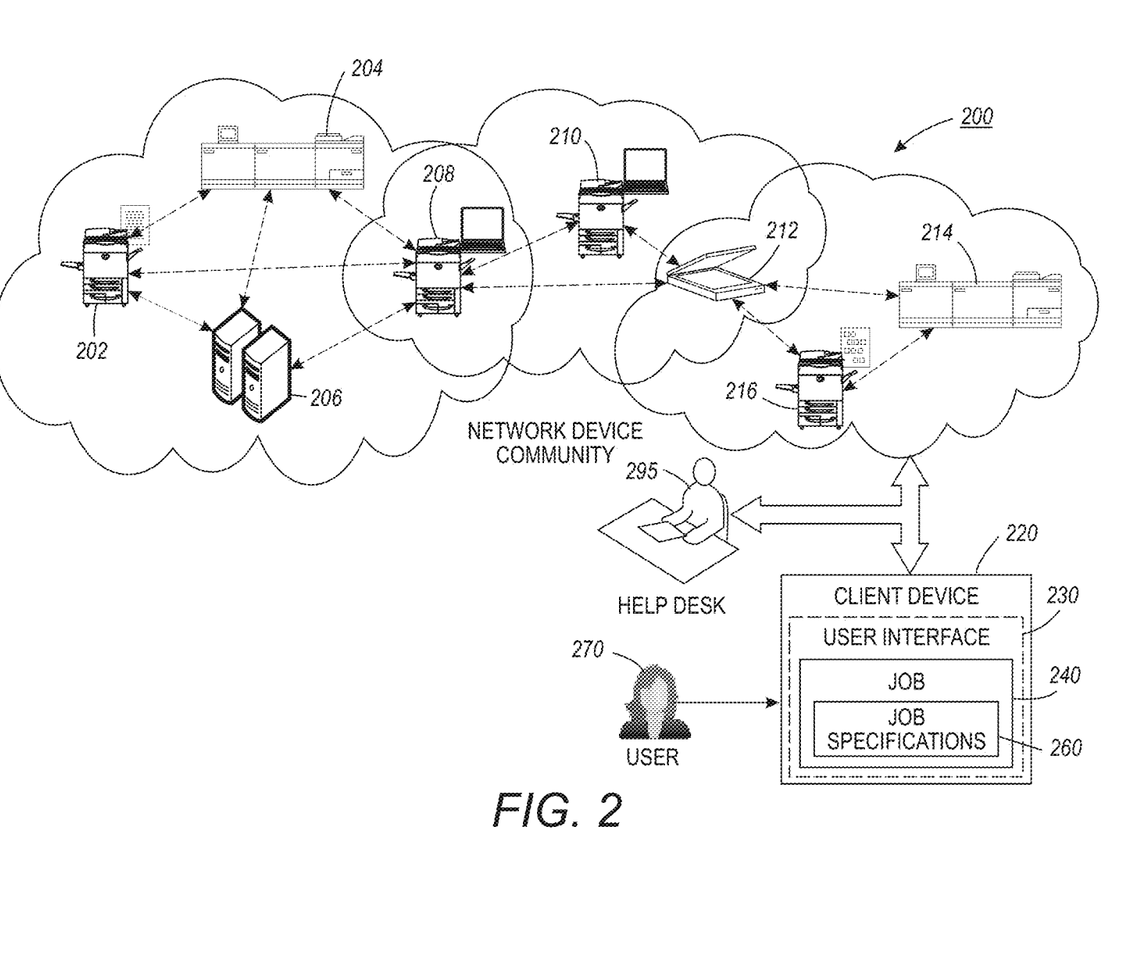
FIG. 2 illustrates a graphical representation of a networked device community, in accordance with the disclosed embodiments.

FIG. 2 illustrates a graphical representation of a networked device community 200, in accordance with the disclosed embodiments. Note that in FIGS. 1-6, identical or similar blocks are generally indicated by identical reference numerals. The networked device community 200 includes one or more networked devices such as, for example, printers 202 and 204, photo-copy machines 208 and 210, a scanner 212, multi-function devices 214 and 216, and a file server and/or a print server 206 that are connected via a peer-to-peer connection in order communicate the capabilities and other information within the device community 200.

The networked devices 202, 204, 206, 208, 210, 212, 214 and 216 in the device community 200 can communicate via a standard protocol such as, for example, a SNMP (Simple Network Management Protocol) and a file transfer protocol. Note that the device community 200 described herein can be a group of interdependent elements inhabiting the same region and interacting with each other with a measure of self-reliance.

The peer-peer based networked device community 200 can be created by utilizing a manual/self-discovery approach based on a set of rules and policies in order to communicate a device capability within the device community 200. Note that the peer-to-peer (P2P) connection technique can be a communication model in which each device 202, 204, 206, 208, 210, 212, 214 and 216 has similar computing capabilities for initiating a communication section. The peer-to-peer connection is a type of transient network that permits a group of users within the same community to connect with each other and directly access the data files. The peer-to-peer networks can be typically employed for connecting the networked devices 202-216 via an ad hoc connection. Note that the networked devices 202-216 can be connected as a member of a number of communities in order to enable bridging between the communities.

A user 270 such as, for example, a managed print services customer typically accesses the client device 220 in order to submit a job 240 along with job specifications 260 in order to effectively process the job 240 with respect to the device community 200. The job 240 can be moved from one peer to another based on the policies, state, and functionality of the original peer thereby reducing the need for re-submission. The device community 200 further automatically transmits the job 240 between the networked devices 202-216 in response to a help request with respect to an exception condition. Note that the exception condition within the device community 200 can include such as, for example, paper jam, low consumable/quality level, diagnostic mode, print limit, and large queue, etc. within the device community 200.

The help request can be transmitted within the community 200 if a fault device needs to transfer the workload to another device and/or the device that possess a print limit to complete the job 240. The networked devices 202-216 can request allocations from other devices in order to complete and/or accept the jobs 240 in the community 200. The devices that possess capability to complete the job 240 can further indicate acceptance of the job 240 with respect to the fault device based on its compatibility.

For example, consider a networked device is in a jam state for a time period (e.g., 'x' minutes), which is unable to process large number of jobs queued for processing and the total time with respect to the networked device exceeds a threshold. The device is further lacking an appropriate resource, quality level, and policy requirements to complete the job. Such networked device can transmit a request for spare bandwidth from other devices in the community 200 in order to complete the jobs 240 with respect to the user 270. The device community 200 also generates a notification indicative of the transmission of the job 240 with respect to the user 270. The status and consumables with respect to each networked device 202-216 can be monitored and tracked utilizing a self-assessment approach in order to automatically transmit and accept the job 240 within the community 200.

Such automatic transmission of jobs 240 provides internal workload balancing with greater customer satisfaction by re-routing the job 240 from devices in exception conditions. A "help desk" 295 associated with the device community typically monitors and provides information with respect to a deleted and/or dropped off networked device in the device community 200. The help desk 295 determines an IP (Internet Protocol) address change, subnet change, and/or community discovery process and finds all new devices within the community 200. The help desk 295 can also alert the devices regarding changes in the community 200. The help desk 295 can run on a device basis or via a community basis by rechecking memberships and comparing with other communities in the network. The networked devices 202-216 within the community 200 are capable of self-updating and sharing pre-paid print allocations and contact external resources that describe device capabilities for specific devices. The devices 202-216 can also effectively share/compare policy checks with respect to the jobs across the device community 200.

Figure 3:
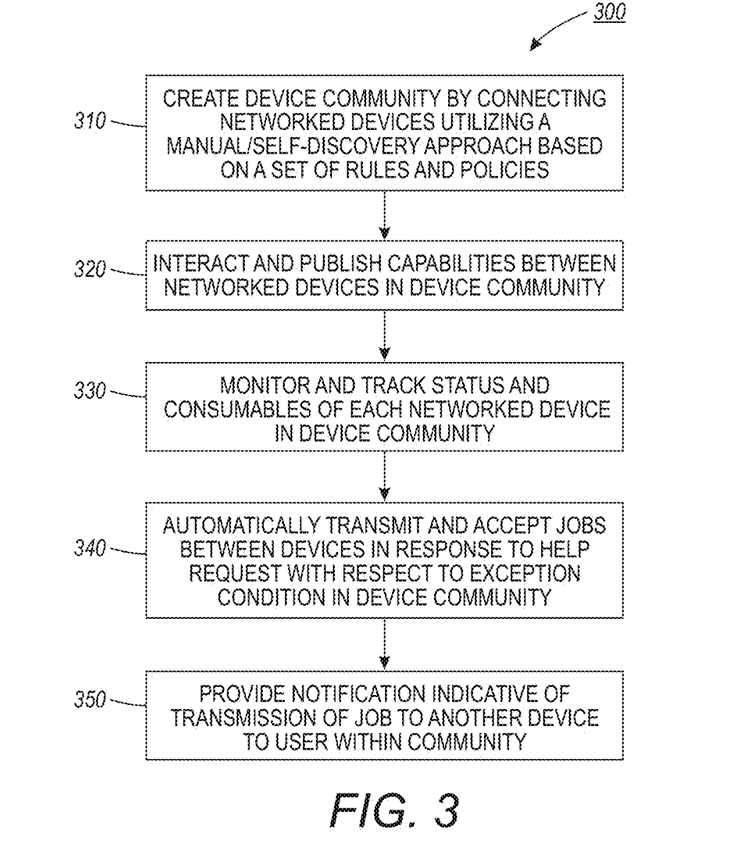
FIG. 3 illustrates a high level flow chart of operations illustrating logical operational steps of a method for redirecting a job within the networked device community, in accordance with the disclosed embodiments.
Figure 4:
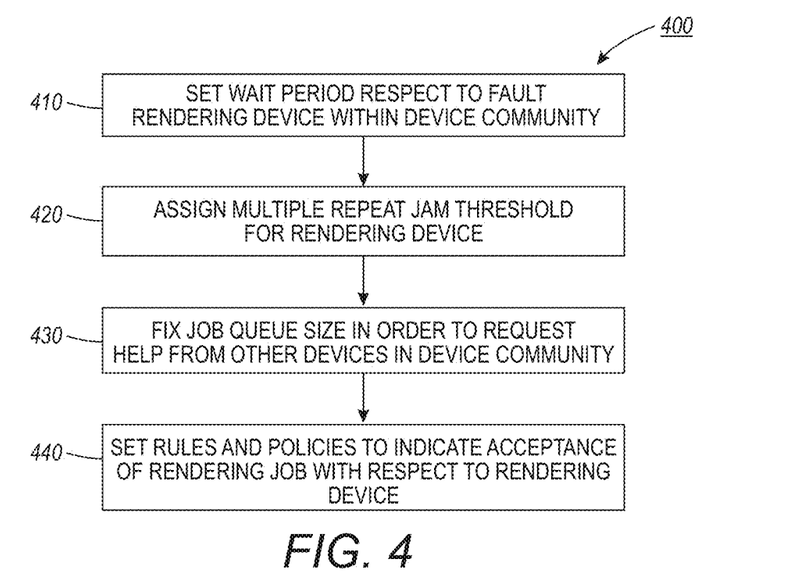
FIG. 4 illustrates a flow chart of operations depicting logical operational steps of a method for configuring rules and policies with respect to the networked device in the device community, in accordance with the disclosed embodiments.

FIG. 3 illustrates a high level flow chart of operations illustrating logical operational steps of a method 300 for redirecting the jobs 240 within the networked device community 200, in accordance with the disclosed embodiments. Connecting the networked devices 202-216 utilizing the manual/self-discovery approach based on the set of rules and policies can create the device community 200, as depicted at block 310. FIG. 4 illustrates a detailed flow chart of operations illustrating logical operational steps of a method 400 for configuring rules and policies with respect to the networked devices 202-216 in the device community 200, in accordance with the disclosed embodiments. The rules and policies can be created based on one or more device parameters such as machine location, subnet addresses, feature sets, and a specific balance of machine types, etc. in order to determine the conditions for generating the request for help within the community 200.

A wait period can be set with respect to the fault device when there is no activity to clear the fault within the community 200, as illustrated at block 410. Multiple repeat jams can be assigned with respect to the fault-rendering device, as depicted at block 420. A job queue size can be further fixed in order to request help from other devices in the community 200, as indicated at block 430. Thereafter, the rules and policies with respect to the fault device can be set in order to indicate the acceptance of the job 240 by automatically transferring the jobs 240 to other devices in the community 200, as illustrated at block 440.

Figure 5:
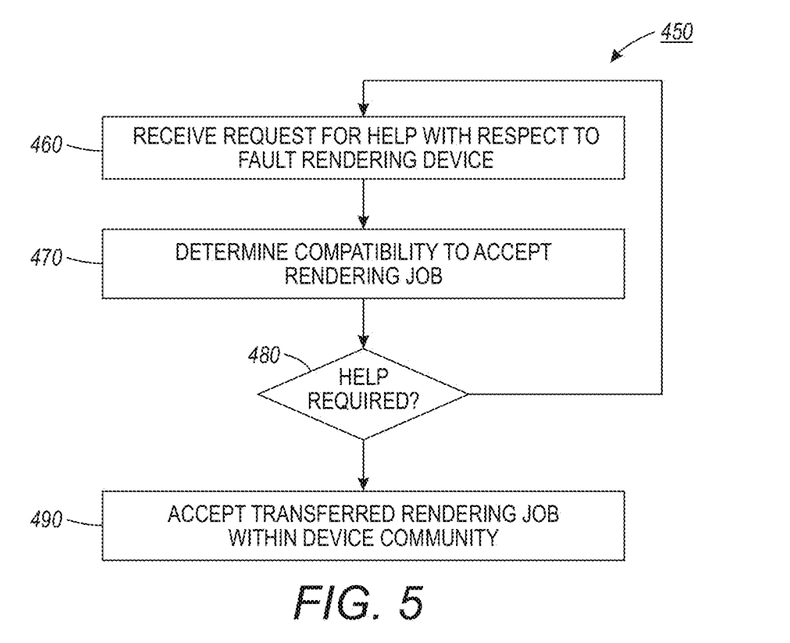
FIG. 5 illustrates a flow chart of operations depicting logical operational steps of a method for providing a response with respect to a request for help within the device community, in accordance with the disclosed embodiments.

The networked devices 202-216 can be further permitted to interact and publish the device capabilities within the device community 200, as depicted at block 320. A self-assessment approach can be employed to monitor and track the status and consumables of each networked device 202-216 in the community 200, as illustrated at block 330. The jobs 240 can be automatically transmitted and accepted between the devices in response to the help request with respect to the exception condition in the device community 200, as depicted at block 340. FIG. 5 illustrates a detailed flow chart of operations illustrating logical operational steps of a method 450 for providing response with respect to the help request within the device community 200, in accordance with the disclosed embodiments.

The help request with respect to the fault device can be transmitted to other devices in the device community 200, as illustrated at block 460. The capability of each device in the community 200 can be determined based on the device parameters, as depicted at block 470. A determination can be made whether the fault device requires help; as indicated at block 480. If help is required, the jobs 240 with respect to the fault device can be accepted within the device community 200, as illustrated at block 490. Otherwise, the process can be continued from block 460. Thereafter, the user 270 can be provided with the notification indicative of the transmission of the job 240 to other devices in the community 200, as depicted at block 350.

Figure 6:
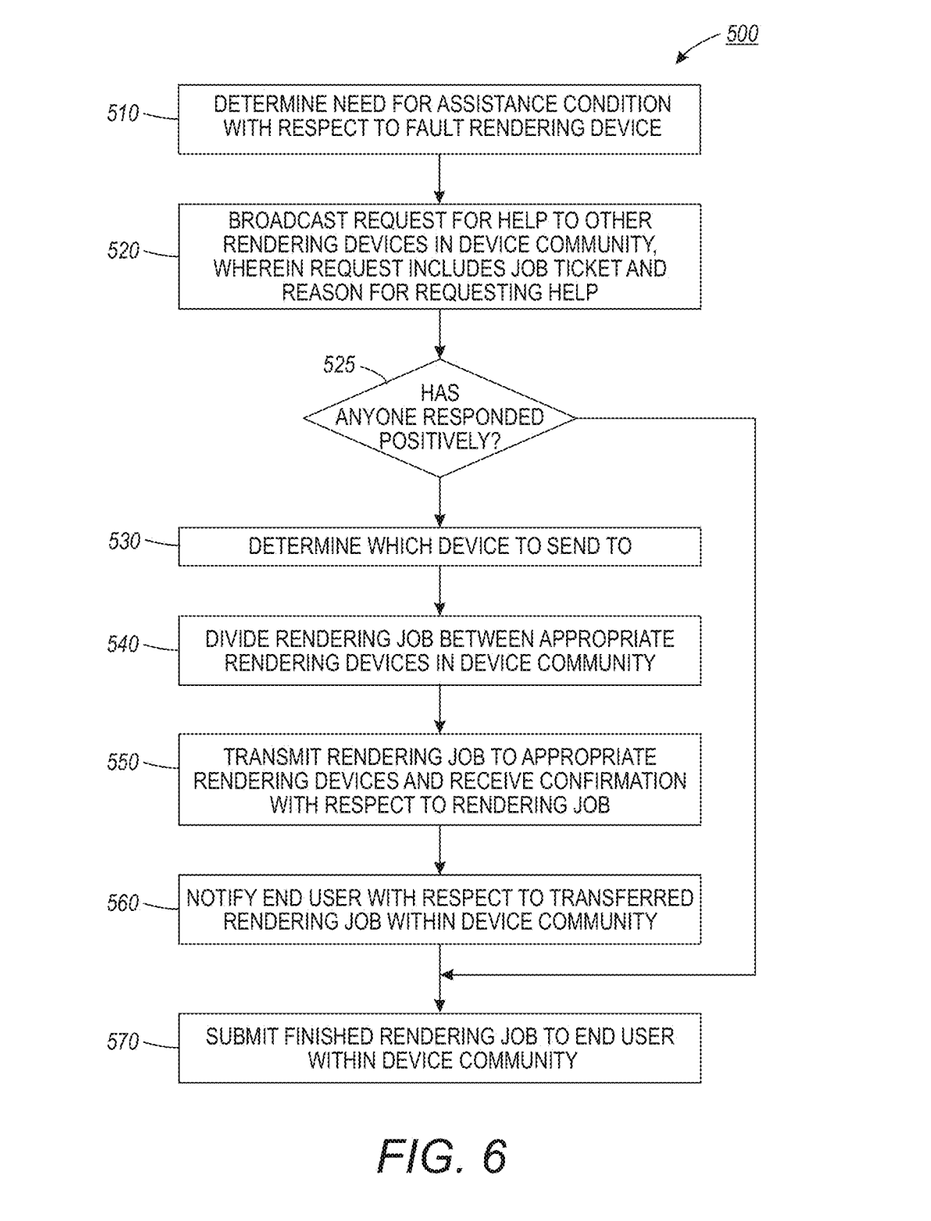
FIG. 6 illustrates a flow chart of operations depicting logical operational steps of a method for processing a job transfer request in the device community, in accordance with the disclosed embodiments.

FIG. 6 illustrates a flow chart of operations depicting logical operational steps of a method 500 for processing a job transfer request in the device community 200, in accordance with the disclosed embodiments. A need for assistance condition can be determined with respect to the fault device within the community 200, as indicated at block 510. Next, as indicated at block 520, a request for assistance can be broadcast to other devices in the device community 200. Such a request can include the job ticket (with job features such as resolution, finishing, color, etc) and the reason it is requesting help (e.g., what part of its own self-assessment failed). Thereafter, as illustrated at block 525, a test can be automatically processed to determine if anyone (e.g., any other devices in the device community) has responded positively. If it is determined that a device has responded positively, then as illustrated at block 530, a determination can be made as to which device to send to. Otherwise, the operation indicated at block 570 can be processed (which is discussed below). Assuming that a determination has been made that someone has responded positively, the job 240 can be divided between the appropriate networked devices in the community 200, as indicated at block 540.

The job 240 can be further transmitted to appropriate devices and a confirmation can be received with respect to the transmitted jobs 240, as depicted at block 550. Note that the jobs 240 are transmitted as un-RIP'd jobs in the community 200. The jobs 240 can be transmitted to the devices via a message and/or displayed at the user interface such as user interface 145 of the rendering device 140. The notification can be further provided with respect to the transmitted jobs 240 within the device community 200, as illustrated at block 560. Finally, the finished jobs can be effectively submitted to the user 270 across the device community 200, as depicted at block 570.

The networked devices in the device community requests help from other peer devices, respond to help requests of peers, request capability-shared services from peers, and share pre-paid print avocations within the community. The devices in the community effectively transmit the jobs from one peer to another based on the policies, state, and functionality of the peers by reducing the need for re-submission. Such a system and method therefore effectively process and manage the resources with respect to the device community and minimize communications outside a customer firewall with a perception of higher security.

Figure 7:
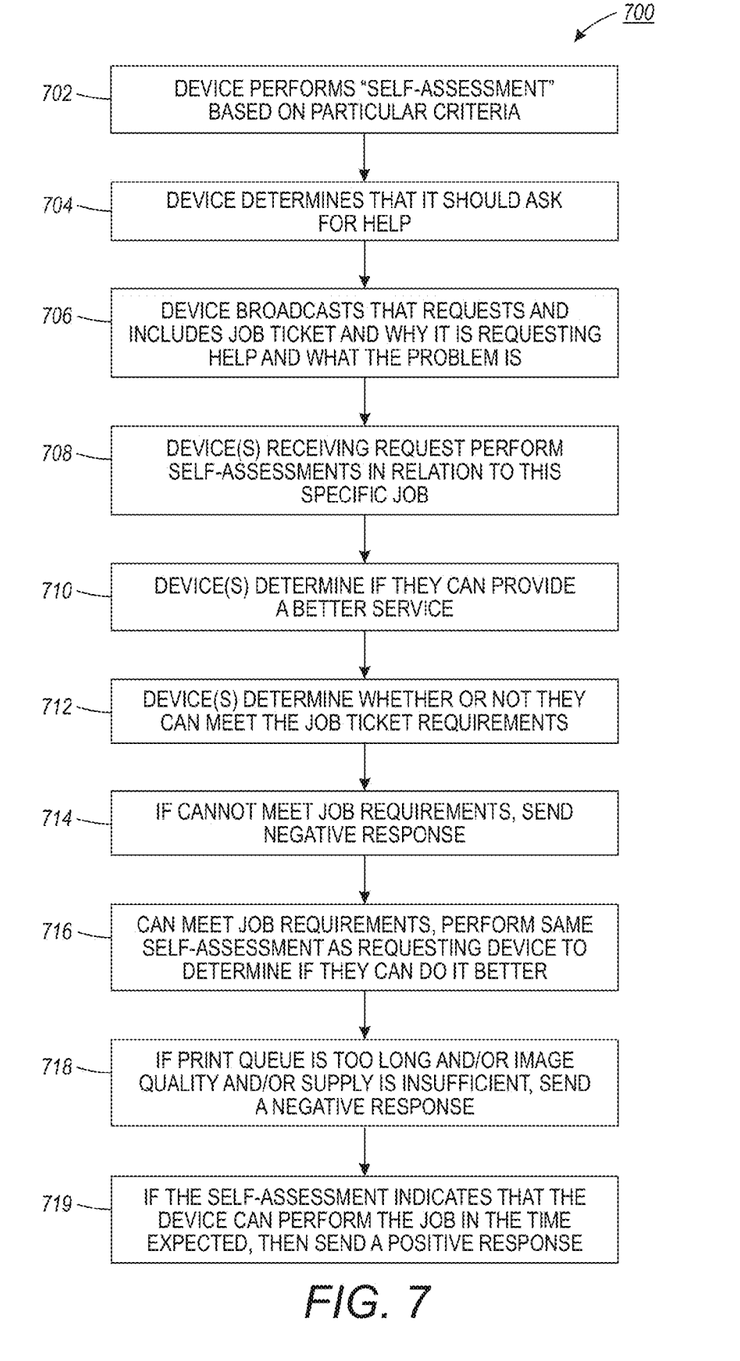
FIG. 7 illustrates a flow chart of operations depicting logical operational steps of a method for automatically redirecting jobs in a device community, in accordance with the disclosed embodiments.

FIG. 7 illustrates a flow chart of operations depicting logical operational steps of a method 700 for automatically redirecting jobs in a device community, in accordance with the disclosed embodiments. As indicated at block 702 in FIG. 7, the device performs a "self-assessment" based on particular criteria such as, for example, the criteria set up depicted in FIG. 4. Thereafter, as depicted at block 704, the device determines that it should ask for help. Then, as illustrated at block 706, the device broadcasts that request and includes the job ticket and why it is requesting help (e.g., what the problem is). Next, as described at block 708, the device(s) receiving the request are automatically instructed to perform a self-assessment in relation to this specific job, and then, as indicated at block 710, determine if they can provide a better service.

Following processing of the operation indicated at block 712, the device(s) can be instructed to automatically determine whether or not they can meet the job ticket requirements (e.g. if the job requires staples, or duplex or color). Thereafter, as described at block 714, if the device(s) cannot meet the job requirements, then the device(s) send a negative response. Then, as depicted at block 716, if the device(s) meet the requirements, such device(s) can then perform the same self-assessment as the requesting device to determine if they can provide a better functionality. If their print queue is so long that the job would take even longer or if their image quality or supply levels are insufficient, then as indicated at block 718, the device(s) can automatically send a negative response. Additionally, as depicted thereafter at block 719, if the self-assessment indicates that the device can perform the job in the time expected, then a positive response can be automatically sent. The process depicted in FIG. 7 can then end.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for automatically redirecting jobs in a device community, said method comprising:
    configuring a device community by connecting at least two networked devices to one another to form said device community based on a set of rules and policies in order to interact and publish a device capability with respect to said at least two networked devices of said device community;
    monitoring and tracking a status of said at least two networked devices associated with said device community via a self-assessment approach in order to thereafter transmit a job between said at least two networked devices in response to a help request with respect to an exception condition indicating a fault device needs to transfer a workload to another device within said device community wherein each receiving device of said at least two networked devices receiving said help request automatically performs a self-assessment in relation to said job based on a particular set up criteria and thereafter determines if said receiving device is able to provide a better service than said fault device sending said help request; and
    providing a notification indicative of a transmission of said job with respect to a user in said device community, thereby effectively re-routing said job between said at least two networked devices across said device community while providing internal workload balancing with respect to said device community.

2. The method of claim 1 further comprising:
    connecting each networked device within said device community as a member of a plurality of device communities in order to enable bridging of communications between said plurality of communities of which said device community comprises at least one community among said plurality of communities; and
    transmitting a negative response if said receiving device is unable to provide said better service.

3. The method of claim 1 further comprising:
    transmitting said help request within said device community if said fault device in said exception condition is required to transfer said job to said at least two networked devices; and
    transmitting an acceptance from said receiving device with respect to said job from said fault device based on said receiving device's compatibility to process said job.

4. The method of claim 1 further comprising:
    transmitting said help request within said device community if said fault device is unable to complete said job; and
    dividing said job between a plurality of receiving devices of said at least two networked devices.

5. The method of claim 1 further comprising requesting at least one pre-paid print allocation from said at least two networked devices by said fault device in order to accept and complete said job in said device community.

6. The method of claim 5 further comprising self-updating and sharing said at least one pre-paid print allocation in order to contact an external resource that describes said device capability with respect to said at least two networked devices.

7. The method of claim 1 further comprising sharing at least one policy check with respect to said job between said at least two networked devices across said device community.

8. The method of claim 1 further comprising communicating said at least two networked devices in said device community via at least one of the following standard protocols:
    a simple network management protocol; and
    a file transfer protocol.

9. The method of claim 1 further comprising connecting said at least two networked devices in said community via a peer-to-peer connection.

10. The method of claim 1 further creating said device community utilizing at least one of the following approaches:
    a manual approach; and
    a self-discovery approach.

11. A system for automatically redirecting jobs in a device community, said system comprising:
    a processor;
    a data bus coupled to said processor; and
    a computer-usable non-transitory medium embodying computer code, said computer-usable medium being coupled to said data bus, said computer program code comprising instructions executable by said processor and configured for:
        arranging a device community by connecting at least two networked devices to one another to form said device community based on a set of rules and policies in order to interact and publish a device capability with respect to said at least two networked devices of said device community;
        monitoring and tracking a status of said at least two networked devices associated with said device community via a self-assessment approach in order to thereafter transmit a job between said at least two networked devices in response to a help request with respect to an exception condition indicating a fault device needs to transfer a workload to another device within said device community wherein each receiving device of said at least two networked devices receiving said help request automatically performs a self-assessment in relation to said job based on a particular set UP criteria and thereafter determines if said receiving device is able to provide a better service than said fault device sending said help request; and providing a notification indicative of a transmission of said job with respect to a user in said device community, thereby effectively re-routing said job between said at least two networked devices across said device community while providing internal workload balancing with respect to said device community.

12. The system of claim 11 wherein said instructions are further configured for:

connecting each networked device within said device community as a member of a plurality of device communities in order to enable bridging of communications between said plurality of communities of which said device community comprises at least one community among said plurality of communities; and transmitting a negative response if said receiving device is unable to provide said better service.

13. The system of claim 11 wherein said instructions are further configured for:

transmitting said help request within said device community if fault device in said exception condition is required to transfer said job to said at least two networked devices; and transmitting an acceptance from said receiving device with respect to said job from said fault device based on said receiving device's compatibility to process said job.

14. The system of claim 11 wherein said instructions are further configured for transmitting said help request within said device community if said networked device having a print limit is unable to complete said job.

15. The system of claim 11 wherein said instructions are further configured for requesting at least one pre-paid print allocation from said at least two networked devices by said fault device in order to accept and complete said job in said device community.

16. The system of claim 15 wherein said instructions are further configured for self-updating and sharing said at least one pre-paid print allocation in order to contact an external resource that describes said device capability with respect to said at least two networked devices.

17. The system of claim 11 wherein said instructions are further configured for sharing at least one policy check with respect to said job between said at least two networked devices across said device community.

18. The system of claim 11 wherein said instructions are further configured for communicating said at least two networked devices in said device community via at least one of the following standard protocols:

a simple network management protocol; and a file transfer protocol.

19. The system of claim 11 wherein said instructions are further configured for connecting said at least two networked devices in said community via a peer-to-peer connection.

20. A system for automatically redirecting jobs in a device community, said system comprising:

a processor;

a data bus coupled to said processor; and a computer-usable non-transitory medium embodying computer code, said computer-usable medium being coupled to said data bus, said computer program code comprising instructions executable by said processor and configured for: arranging a device community by connecting at least two networked devices to one another to form said device community based on a set of rules and policies in order to interact and publish a device capability with respect to said at least two networked devices of said device community;

monitoring and tracking a status of said at least two networked devices associated with said device community via a self-assessment approach in order to thereafter transmit a job between said at least two networked devices in response to a help request with respect to an exception condition indicating a fault device needs to transfer a workload to another device within said device community wherein each receiving device of said at least two networked devices receiving said help request automatically performs a self-assessment in relation to said job based on a particular set UP criteria and thereafter determines if said receiving device is able to provide a better service than said fault device sending said help request;

providing a notification indicative of a transmission of said job with respect to a user in said device community, thereby effectively re-routing said job between said at least two networked devices across said device community while providing internal workload balancing with respect to said device community; and communicating said at least two networked devices in said device community via at least one of the following standard protocols:

a simple network management protocol; or a file transfer protocol.

* * * * *